United States Patent [19]

Iwasawa et al.

[11] 4,422,023
[45] Dec. 20, 1983

[54] STARTING CIRCUIT FOR ELECTRONICALLY CONTROLLED MOTOR APPARATUS

[75] Inventors: Teruo Iwasawa, Mitaka; Hitomi Tojiki, Hachioji, both of Japan

[73] Assignee: Olympus Optical Co., Ltd., Tokyo, Japan

[21] Appl. No.: 281,949

[22] Filed: Jul. 10, 1981

[30] Foreign Application Priority Data

Jul. 17, 1980 [JP]  Japan .......................... 55-100975[U]

[51] Int. Cl.³ ............................................... H02P 5/16
[52] U.S. Cl. .................................... 318/384; 318/386; 318/317
[58] Field of Search .............. 318/384, 386, 400, 410, 318/430, 431, 778, 447, 317, 318, 314, 327

[56] References Cited

U.S. PATENT DOCUMENTS

| | | | |
|---|---|---|---|
| 3,875,487 | 4/1975 | White ................................. | 318/447 |
| 3,944,900 | 3/1976 | Rohsler ............................. | 318/317 |
| 4,149,117 | 4/1979 | Weber ................................ | 318/318 |
| 4,168,455 | 9/1979 | Soeda et al. ...................... | 318/317 |
| 4,177,411 | 12/1979 | Takaoka ............................ | 318/318 |
| 4,211,964 | 7/1980 | Yabu et al. ........................ | 318/318 |
| 4,218,641 | 8/1980 | Arnold et al. ..................... | 318/329 |
| 4,233,549 | 11/1980 | Dighe ................................ | 318/317 |
| 4,286,199 | 8/1981 | Nagakubo et al. ................. | 318/318 |
| 4,322,712 | 3/1982 | Yoshida ............................ | 318/327 |
| 4,355,268 | 10/1982 | Iwasawa et al. ................... | 318/314 |

FOREIGN PATENT DOCUMENTS 54-32126 of 0000 Japan.

OTHER PUBLICATIONS

"The Motor Speed Control IC for F-G Servo System, Kenji Kano, Koichi Hayamizu, Kitaitami Works of Mitsubishi Electric Corp."

*Primary Examiner*—B. Dobeck
*Assistant Examiner*—A. Evans
*Attorney, Agent, or Firm*—Frishauf, Holtz, Goodman and Woodward

[57] ABSTRACT

A starting circuit for an electronically controlled actuator having an integration capacitor provided in a control signal path and a power supply circuit for supplying a power supply voltage to the motor apparatus, comprises a comparator having first and second given voltages, and a switch circuit coupled to the comparator and to the integration capacitor. The comparator compares the power supply voltage with the first and second given voltages and provides a comparison result when the power supply voltage corresponds to a voltage range between the first and second given voltages. The switch circuit discharges the charge stored in the integration capacitor when the comparison result is provided from the comparator.

14 Claims, 7 Drawing Figures

FIG. I
PRIOR ART

F I G. 4
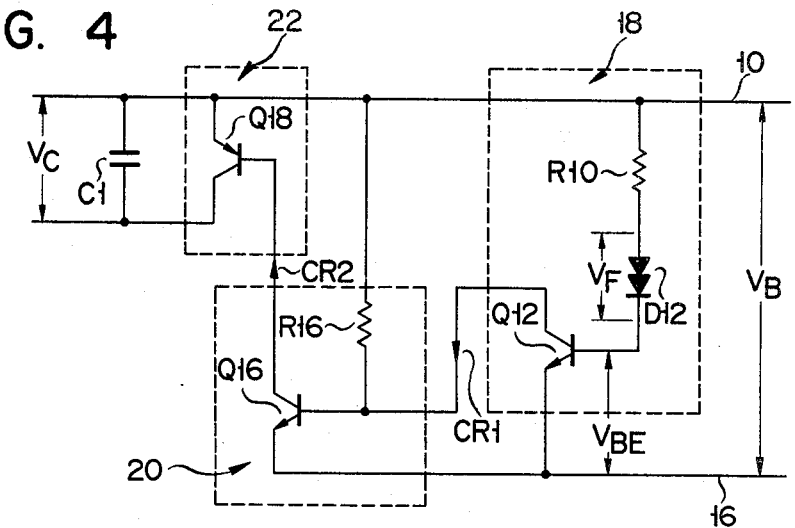
F I G. 5
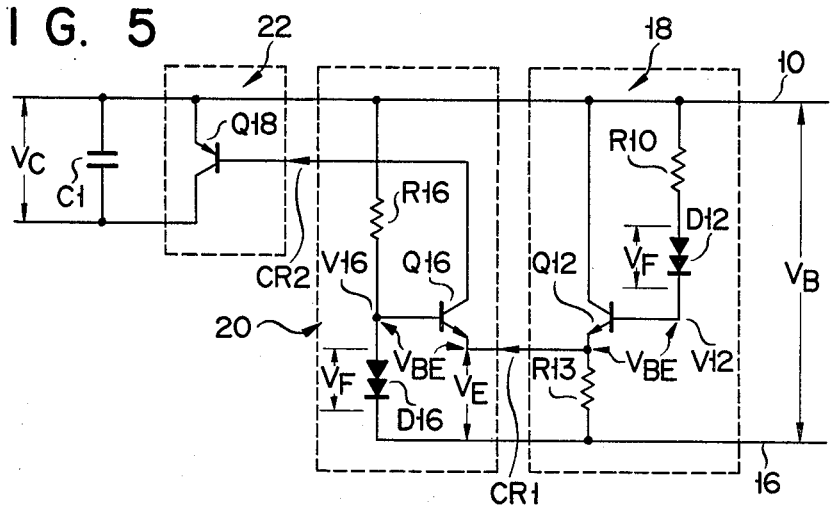
F I G. 6
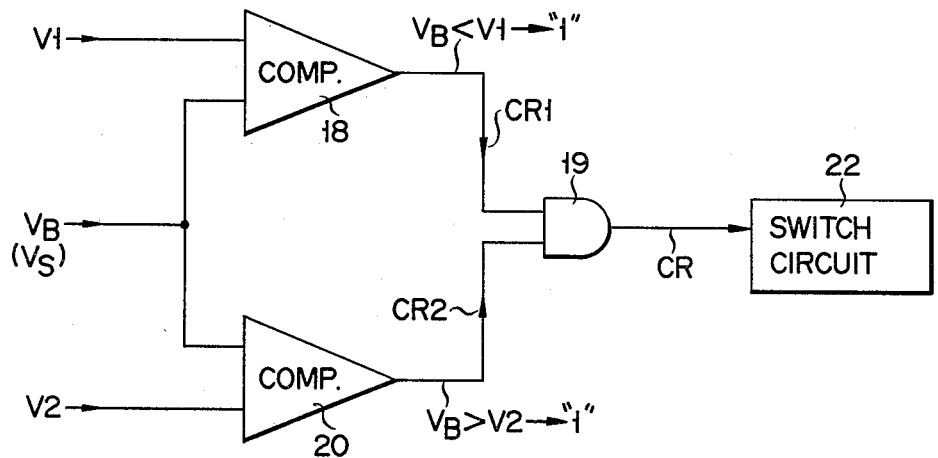

4,422,023

STARTING CIRCUIT FOR ELECTRONICALLY CONTROLLED MOTOR APPARATUS

BACKGROUND OF THE INVENTION

This invention relates to electronically controlled actuators such as electronic servo-controlled motors and, more particularly, to a starting circuit for stabilizing the starting performance of such an actuator.

A motor with which stable and constant speed rotation can be obtained without being affected by changes of the load or other external disturbances is desired for such purposes as driving a capstan in a tape recorder. Various motors of this sort have been developed, and an example of them is a DC servo-motor which includes a pulse count type frequency-to-voltage (F/V) converter in its servo-loop. A motor control apparatus which is applicable for use with this type of servo-motor is disclosed in Japanese Patent Publication No. 32126/79. The servo-loop of the disclosed motor control apparatus mentioned above includes an integration capacitor. This integration capacitor is essential for the stable operation of the servo-loop. When the servo-loop is in operation, a quantity of charge within a constant range is charged into and discharged from the integration capacitor.

The power supply of the apparatus where the servo-motor as mentioned above is employed is turned on and off entirely arbitrarily. It is now assumed that an uncertain quantity of charge remains in the integration capacitor when the power supply of the motor control apparatus is turned on after it has been turned off once. In this case, the starting performance of the motor after the power supply is turned on fluctuates due to the aforementioned uncertain quantity of residual charge; that is, the starting performance of the apparatus is subject to fluctuations in an uncertain fashion depending upon the on-off operation of the power supply switch.

In order to solve this problem, it has been proposed to connect a diode in parallel with the integration capacitor for discharging the residual charge after the turning-off of the power supply. In this case, however, when the voltage across the integration capacitor becomes lower than the forward voltage drop VF of the diode, the residual charge in the integration capacitor can no longer be discharged. Therefore, this parallel diode connection method cannot give a sufficient solution to the above problem.

SUMMARY OF THE INVENTION

This invention is intended in the light of the above affairs, and its object is to provide a starting circuit for an electronically controlled motor apparatus having an integration capacitor, with which a uniform starting performance of the motor apparatus after the turning-on of the power supply of the motor apparatus can be obtained.

To attain this object, the starting circuit according to the present invention is provided with a switch circuit for forcibly discharging the charge stored in the integration capacitor when the power supply voltage corresponds to a voltage in a predetermined range. With this forced discharge by the switch circuit, the integration capacitor is always charged substantially under a constant condition when the power supply is turned on. Thus, where the actuator includes a servo-motor, the starting performance after the power supply is turned on is constant.

BRIEF DESCRIPTION OF THE DRAWINGS

FIGS. 4 to 6 are circuit diagrams showing modifications of the circuit of FIG. 2.

DETAILED DESCRIPTION OF THE PREFERRED EMBODIMENTS

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of the starting circuit for an electronically controlled motor apparatus according to the invention will now be described.

Figure 1:
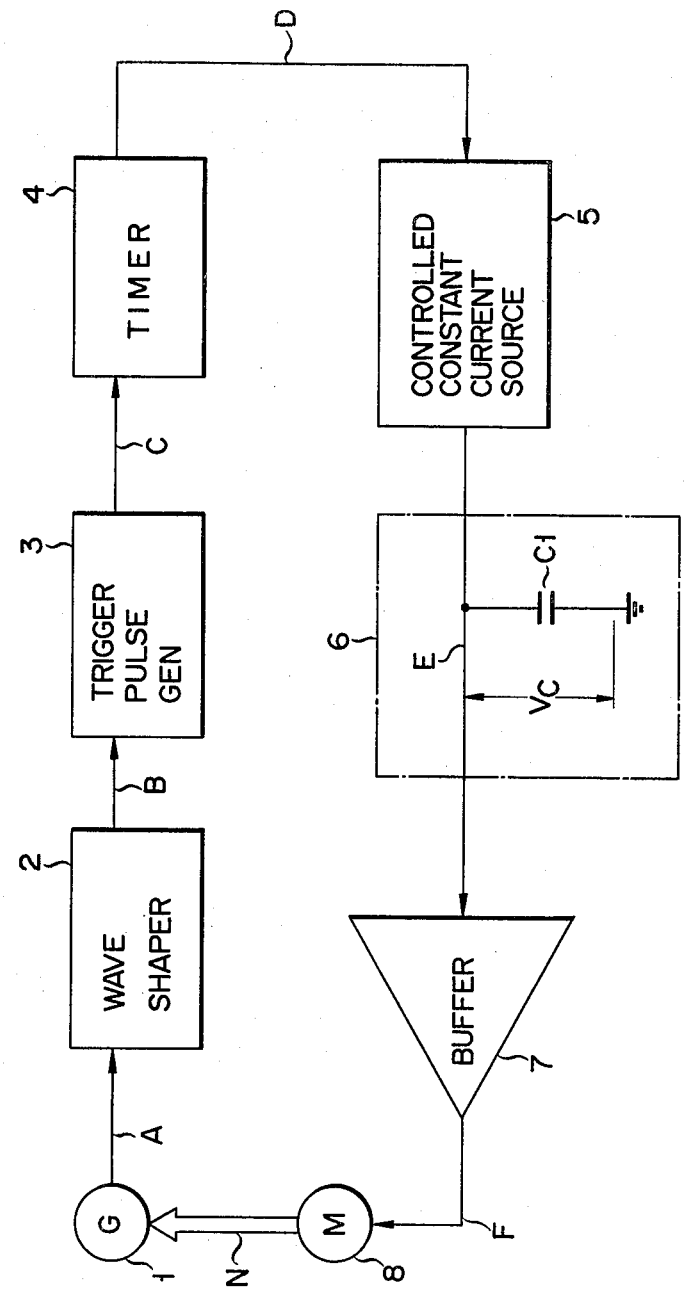
FIG. 1 is a block diagram showing the typical construction of a servo-motor speed control system to which the starting circuit according to the invention is applicable.

FIG. 1 shows the construction of a servo-motor speed control system to which the starting circuit according to the invention is applicable. This construction itself is prior art, so it will be described very briefly.

A DC motor 8 is coupled to a frequency generator 1. The generator 1 provides a detection output A proportional to the rotational speed N of the motor 8. The output A is converted by a wave shaper 2 into a square wave signal B which is supplied to a trigger pulse generator 3. The generator 3 is triggered by the rising edge of the signal B to produce a trigger pulse C in an impulse form. The pulse C is supplied to a timer 4 to start the timer. Then, the timer 4 generates a control signal D which assumes a low level for a predetermined period of time. The signal D is supplied to a controlled constant current source 5. The output of the current source 5 is coupled to a low-pass filter 6. The constant current source 5 serves to charge and discharge an integration capacitor C1 provided in the low-pass filter 6 according to the logic level of the signal D. The charging level E of (or charging voltage VC across) the capacitor C1 varies in correspondence to the ratio between the period during which the signal D is at low level and the period during which the signal D is at high level. In other words, the average value of the potential E is inversely proportional to the cycle period of the trigger pulse C; that is, the potential E is decreased with increasing rotational speed N of the motor 8. The potential E is converted through a buffer into a power supply signal F which is supplied to the motor 8.

The component elements 1 to 8 form a pulse count type servo-loop, in which the low-pass filter 6 undertakes the F/V conversion. The rotational speed N of the motor 8 may be adjusted, for instance, by varying the aforementioned predetermined period of the timer 4.

In the control system described above, the integration capacitor C1 having a stored charge is included in the control signal path or servo-loop. Therefore, if there is no means for preventing fluctuations of the stored charge, the starting performance of the motor 8 will fluctuate.

Figure 2:
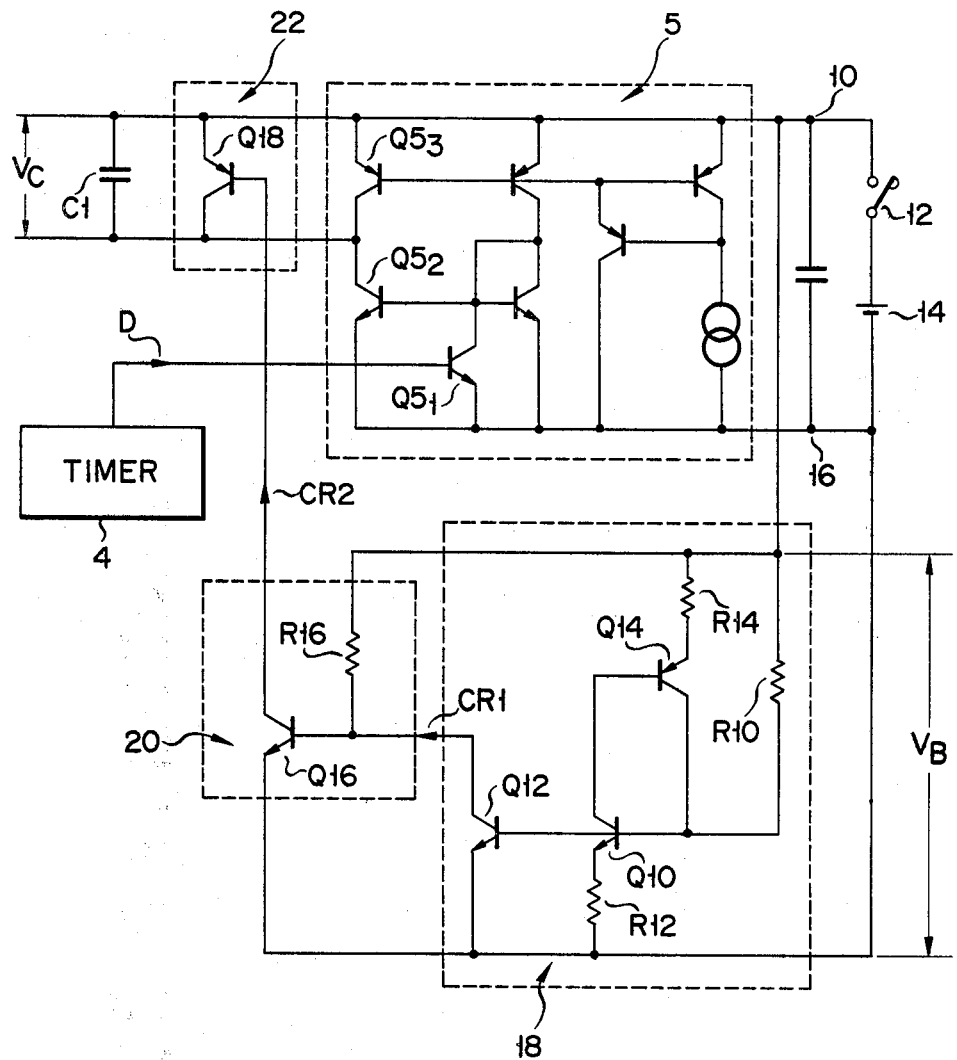
FIG. 2 is a circuit diagram showing an embodiment of the starting circuit according to the invention.

FIG. 2 shows how the invention is applied to the circuit construction of FIG. 1 for suppressing the fluctuations of the starting performance. An integration capacitor C1 is connected to a positive voltage supply circuit 10. The circuit 10 is connected through a power switch 12 to the positive terminal of a power supply 14. A controlled constant current source 5 is connected to the circuit 10. It has a well-known circuit construction as disclosed in the aforementioned Japanese Patent Publication No. 32126/79. The circuit construction of the constant current source 5 itself does not constitute the subject matter of the invention, and only a necessary description for understanding the invention will be given hereinafter concerning the constant current source 5. A control signal D is supplied from a timer 4 to the constant current source 5. When the signal D goes to a low level, an NPN transistor $Q5_1$ is turned off even in the "on" state of the switch 12. As a result, an NPN transistor $Q5_2$ is turned on, and the capacitor C1 is charged by the difference between the collector current in the transistor $Q5_2$ and the collector current in a PNP transistor $Q5_3$. When the signal D goes to a high level, the transistor $Q5_2$ is turned off, and the capacitor C1 is discharged by the collector current in the transistor $Q5_3$. It is important here that after the switch 12 is turned off, at which time the transistors $Q5_2$ and $Q5_3$ are turned off, no escapement way for the charge stored in the capacitor C1 is provided in the constant current source 5. In other words, when the switch 12 is turned off, the charge in the capacitor C1 can be discharged only in the form of the collector leak current in the transistors $Q5_2$ and $Q5_3$ and input bias current to the buffer 7 shown in FIG. 1. Therefore, in this case, i.e., without any particular discharging means provided, the time constant of the discharge of the capacitor C1 is inevitably very long, for instance several 10 seconds.

The aforementioned positive voltage supply circuit 10 is connected through a resistor R10 to the bases of NPN transistors Q10 and Q12. The emitter of the transistor Q12 is connected to a negative voltage supply circuit 16 of the power supply 14. The emitter of the transistor Q10 is connected via a resistor R12 to the circuit 16. The base of the transistor Q10 is connected to the collector of a PNP transistor Q14, which has its base connected to the collector of the transistor Q10. The emitter of the transistor Q14 is connected through a resistor R14 to the circuit 10. The transistors Q10 and Q14 are in thyristor connection to each other. Thus, they are quickly turned on when the power supply voltage VB between the circuits 10 and 16 exceeds a first given voltage V1 (trigger level). When the transistor Q14 is turned on, the transistor Q12 is forcibly turned on by the collector current of transistor Q14.

The aforementioned first given voltage V1 corresponds to the voltage between the circuits 10 and 16 immediately before the commencement of conduction of the transistor Q10, and it is determined by the base-emitter threshold voltage $V_{BE}$ of the transistor Q10, current amplification factor thereof, resistance of the resistor R10, etc. The transistors Q10, Q12 and Q14 and resistors R10, R12 and R14 form a first comparator 18 which compares the power supply voltage VB and first given voltage V1 and provides a first comparison result CR1.

The collector of the transistor Q12 is connected to the base of an NPN transistor Q16, which has its emitter connected to the aforementioned circuit 16 and its base connected through a resistor R16 to the aforementioned circuit 10. The transistor Q16 is off while the transistor Q12 is on. The transistor Q16 is turned on when the voltage VB mentioned above exceeds a second given voltage V2 while the transistor Q12 is off. In other words, it is turned on when the condition that the voltage VB is lower than the first given voltage V1 and higher than the second given voltage is satisfied. The second given voltage V2 is determined by the base-emitter threshold voltage $V_{BE}$ of the transistor Q16, resistance of the resistor R16, etc. The transistor Q16 and resistor R16 form a second comparator 20 which compares the power supply voltage VB and second given voltage V2 and provides a second comparison result CR2.

The first and second comparators 18 and 20 constitute comparison means which compares the power supply voltage VB with the first and second given voltages V1 and V2. Now, a specific voltage VS which is proportional to the power supply voltage VB will be considered. In this case, the comparison means provides the comparison result CR2 if, for instance, V1>VS>V2. The comparison means may of course compare V1 and V2 with VB as well. However, for checking whether the voltage VB is within a given voltage range (V1 to V2), it is possible to use as the subject of comparison a signal (VS) which is changed with changes of the voltage VB instead of the voltage VB itself. This means that the aforementioned voltage VS may be made the subject of comparison.

The collector of the transistor Q16 is connected to the base of a PNP transistor Q18, which has its emitter and collector connected to the opposite ends of the integration capacitor C1 respectively. The transistor Q18 is turned on when the transistor Q16 is turned on. When the transistor Q18 is turned on, the capacitor C1 is quickly discharged. Through this discharge, the terminal voltage across the capacitor C1 is forcibly reduced toward the collector-emitter saturation voltage $V_{CE(SAT)}$ of the transistor Q18. The transistor Q18 constitutes a switch circuit or discharging means 22 for causing the discharge of the integration capacitor C1 in response to the comparison result CR2 from the comparison means (18+20) mentioned above when the power supply voltage VB or the specific voltage VS corresponds to a voltage between the first and second given voltages V1 and V2.

Figure 3A:
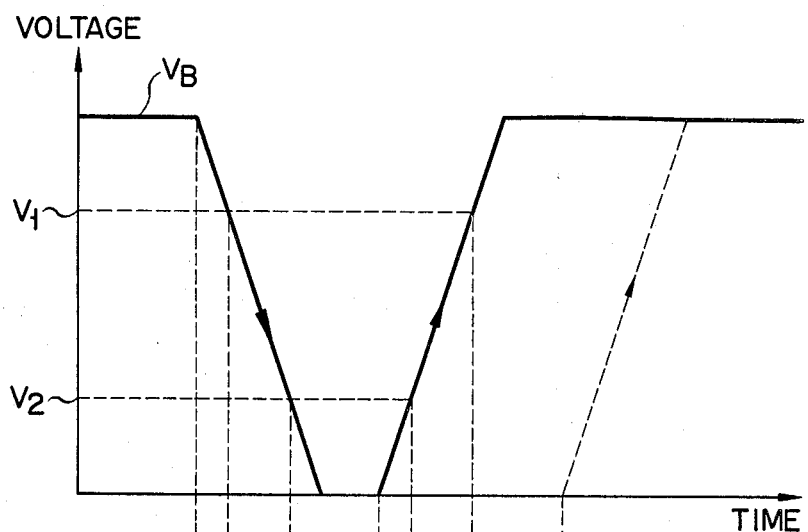
FIGS. 3A and 3B are timing charts illustrating the operation of the circuit shown in FIG. 2.
Figure 3B:
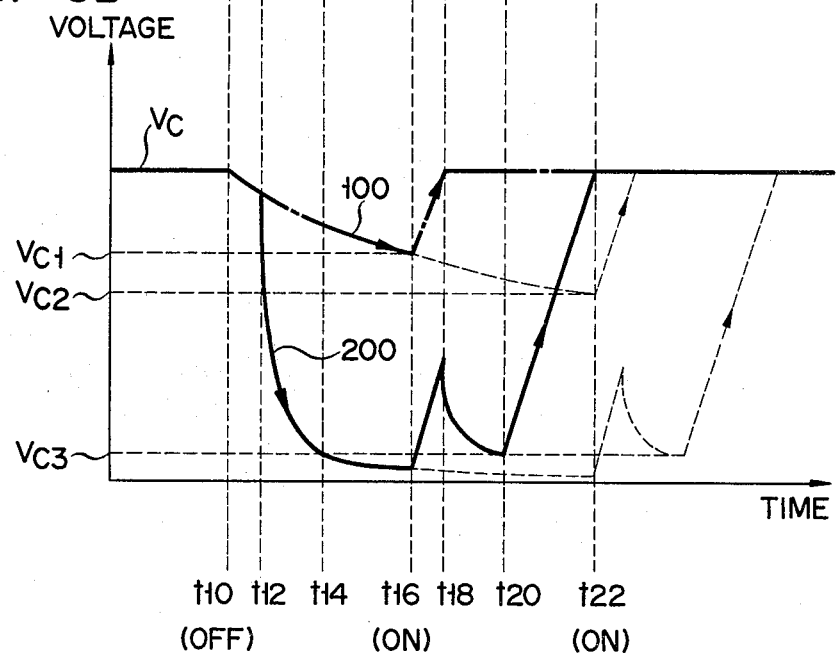

FIGS. 3A and 3B show a timing chart illustrating the operation of the starting circuit shown in FIG. 2. Before an instant t10, the power switch 12 is on, and normal operation of the speed control system shown in FIG. 2 is in force. At this time, the charging voltage with respect to the integration capacitor C1 contains ripple, but this ripple is ignored in FIG. 3B for the sake of simplicity. When the switch 12 is turned off at the instant t10, the charging of the capacitor C1 is no longer made.

Now, a case where the transistor Q18 is not operated is considered. In this case, the charging voltage VC is gradually reduced after the instant t10 as shown by a curve 100. When the switch 12 is subsequently turned on, the capacitor C1 is charged with a constant current. This means that the time until the capacitor C1 is charged up to the normal state after the switch 12 is turned on varies with the value of the voltage VC when the switch 12 is turned on. For example, when the switch 12 is turned on at an instant t16, the capacitor C1 is charged after the instant t16 from a voltage VC1 toward the voltage VC. When the switch 12 is turned on at an instant t22, the capacitor C1 is charged from a voltage VC2 to the voltage VC. In case when the switch 12 is turned on after the lapse of a considerably long period of time from the turning-off of the switch 12, the capacitor C1 is charged substantially from zero volt to the voltage VC. It will be understood that where the transistor Q18 is not operated, the time until the capacitor C1 is charged up varies depending upon the timing with which the switch 12 is turned on. That is, the starting performance of the motor 8 shown in FIG. 1 varies depending upon the on-off timing of the switch 12.

A curve 200 in FIG. 3B is obtained where the transistor Q18 is operated. It is assumed that the switch 12 is turned off at the instant t10 and the power supply voltage VB is reduced to the first given voltage V1 at an instant t12. Then, at the instant t12 the transistor Q12 is turned off to turn on the transistors Q16 and Q18. With the turning-on of the transistor Q18, the capacitor C1 is quickly discharged, and the voltage VC is thus reduced down to the neighborhood of the saturation voltage $V_{CE(SAT)}$ of the transistor Q18 in a very short period of time. When the voltage VB is reduced to the second given voltage V2 at an instant t14, the transistors Q16 and Q18 are turned off. Thus, after the instant t14 the time constant of the discharge of the capacitor C1 is considerably large. By this instant, however, the charging voltage of the capacitor C1 has been reduced to a voltage VC3 near the saturation voltage $V_{CE(SAT)}$.

When the switch 12 is turned on at the instant t16, the charging of the capacitor C1 is started again. When the voltage VB exceeds the second given voltage V2 at an instant t18, the transistor Q18 is turned on to cause forcive discharge of the capacitor C1. When the voltage VB exceeds the first given voltage V1 at an instant t20, the transistor Q18 is turned off again, and thereafter the capacitor C1 is charged with a constant current. The same operation takes place when the switch 12 is turned on at the instant t22. In general, after the switch 12 is turned on, the capacitor C1 is precharged under the condition VB<V2 and is discharged under the condition V2≦VB≦V1. When the condition VB>V1 is obtained, the capacitor C1 is subsequently charged up linearly from the voltage VC3 to the voltage VC.

FIG. 3B shows that after the instant t14 the start voltage of the charging of the capacitor C1 is always the constant voltage VC3. The period from the instant t10 till the instant t14 can usually be set to be less than a fraction of one second, and it is hardly possible that the switch 12 is turned on and off during such a short period of time. Thus, with the construction as shown in FIG. 2 it is possible to uniformalize the starting performance of a control system including an integration capacitor C1 after the turning-on of the power supply. Besides, the components 18, 20 and 22 which constitute a gist of the invention has circuit constructions capable of being readily implemented with IC together with other circuit components.

Where hysteresis is involved in the operation of the components 18, 20 and 22, the voltages V1 and V2 when the power supply is turned off may sometimes be out of coincidence with those when the power supply is turned on. Even where such a hysteresis is involved, the essential character of the starting circuit according to the invention is not changed. A typical example of the voltage comparator having a hysteresis is a Schmitt circuit (or emitter-coupled bistable multivibrator).

FIG. 4 shows a modification of the circuit of FIG. 2. While in the circuit of FIG. 2 use is made of the thyristor circuit constituted by the transistors Q10 and Q14 for ensuring quick and reliable turning-on of the transistor Q12, in the circuit of FIG. 4 the comparator 18 is further simplified. Here, the base of the transistor Q12 is connected to a level shift diode D12 and a resistor R10 to a positive voltage supply circuit 10. The first given voltage V1 in the comparator 18 shown in FIG. 4 is determined chiefly by the base-emitter threshold voltage $V_{BE}$ of the transistor Q12, forward voltage drop across the diode D12 and current amplification factor of the transistor Q12.

FIG. 5 shows another modification of the circuit of FIG. 2. This circuit is different from the circuit of FIG. 2 in the first and second comparators 18 and 20. Although comparator 18 in the circuit of FIG. 5 resembles the comparator 18 in the circuit of FIG. 4 well, it is different in that the emitter of the transistor Q12 is connected through a resistor R13 to a negative voltage supply circuit 16 and the collector of the transistor Q12 is directly connected to a positive voltage supply circuit 10. The emitter of the transistor Q12 is connected to the emitter of a transistor Q16, which has its collector connected to the base of the transistor Q18 and the base connected through the anode-cathode path of a level clamp diode D16 to the circuit 16. The anode of the diode D16 is connected through a resistor R16 to the circuit 10.

The base potential on the transistor Q12 is referred to as V12, the base potential on the transistor Q16 as V16 and the emitter potential on the transistor Q16 as VE with respect to the negative voltage supply circuit 16. The base potential V16 is determined by the forward voltage VF across the diode D16. This voltage VF corresponds to a potential equal to the sum of the voltage $V_{BE}$ on the transistor Q16 and the voltage VE. Now, a case when the power supply voltage VB is applied between the circuits 10 and 16 with the turning-on of the power switch 12 will be considered. In this case, the shift level VF of the diode D12 and the resistance of the resistor R10 are selected such that V12>V16. Under the condition V12>V16, the transistor Q12 is on while the transistors Q16 and Q18 are off. This state corresponds to that before the instant t10 in FIGS. 3A and 3B. It is now assumed that the switch 12 is turned off at the instant t10 and the condition V12<V16 is obtained at the instant t12. The potential VB of the circuit 10 at this time corresponds to the first given voltage V1. When the condition V12<V16 is obtained, the transistor Q12 is turned off, and the transistors Q16 and Q18 are turned on.

When the transistor Q18 is turned on, the capacitor C1 is forcively discharged as shown by the curve 200 in FIG. 3B. After the instant t12 a condition VB>V1 sets in, and under this condition the transistor Q12 is off irrespective of whether the transistor Q16 is on or off. When the base potential V16 on the transistor Q16 becomes lower than $V_{BE}$+VE at the instant t14 in FIG. 3B, the transistors Q16 and Q18 are turned off. Subsequently, when the switch 12 is turned off at the instant t16, the capacitor C1 is precharged from the current source 5 since the transistors Q16 and Q18 are off until the instant t18. During the period from the instant t18 till the instant t20, there holds a condition V16=$V_{BE}$+VE. Thus, during this period the transistors Q16 and Q18 are on, and the capacitor C1 is forcively discharged. When the transistor Q12 is turned on at the instant t20, and the condition V12>V16, i.e., the condition VB>V1, sets in, the transistors Q16 and Q18 are turned off, so that the capacitor C1 is charged from the voltage VC3 to the voltage VC at a constant rate.

The embodiment of the invention described in the specification and illustrated in the drawing, is by no means limitative of the invention, and various changes and modifications are possible without departing from the scope and spirit of the invention. For example, the switch circuit 22 may be constructed by using FETs. If there is no need of entirely implementing the starting circuit according to the invention with IC, the switch circuit 22 may be constructed with a relay or a lead switch (i.e., a switch on-off operated according to whether there is an external magnetic field). Further, while in the illustrated embodiment the first and second comparators 18 and 20 and switch circuit 22 are functionally connected in series, such a series connection of circuit is not essential to the invention. For example, as shown in FIG. 6, a first comparator 18 which provides an output of logic "1" under a condition VB<V1, a second comparator 20 which provides an output of logic "1", under a condition VB>V2 and an AND gate for ANDing the outputs of the first and second comparators may be provided, and the output CR of the AND gate 19 may be used to on-off control the switch circuit 22. In this case, the first and second comparators 18 and 20 are in parallel connection. Regardless of whether the two comparators 18 and 20 are connected in series or in parallel, the switch circuit 22 is functionally connected to the two comparators.

Furthermore, the starting circuit according to the invention may be used with a "MOTOR CONTROL APPARATUS" in the Japanese Patent Application No. 20050/80 (corresponding to USSN 220,364, filed Dec. 29, 1980 and now U.S. Pat. No. 4,355,268 issued Oct. 18, 1982) filed by the same assignee. Further, the invention is applicable not only to motor control systems but also to other systems. In general, the invention may be applied to any electronically controlled motor apparatus, which includes a capacitor for storing the charge provided in a control signal path, and the starting performance of which when the power supply is turned on is uniformalized.

What we claim is:

1. A starting circuit for a motor apparatus including an integration capacitor which stores electrical charge corresponding to the operational state of said motor apparatus, said starting circuit comprising:
   a source of power supply for supplying said motor apparatus with a power supply voltage:
   comparison means having first and second given voltages and coupled to said source of power supply, for comparing a specific voltage corresponding to said power supply voltage with said first and second given voltages; and
   discharge means coupled to said comparison means and to said integration capacitor of said motor apparatus, for discharging the electrical charge stored in said integration capacitor when said specific voltage has a level between said first and second given voltages.

2. A starting circuit for a motor apparatus which includes a motor, comprising:
   first circuit means coupled to said motor for providing a specific signal corresponding to the rotation of said motor;
   an integration capacitor coupled to said first circuit means for storing electrical charge corresponding to said specific signal;
   second circuit means coupled to said integration capacitor and to said motor for transferring a voltage developed in said integration capacitor which corresponds to said specific signal to said motor;
   power supply means for supplying a power supply voltage to said first circuit means;
   comparison means having first and second reference voltages and coupled to said power supply means for comparing said power supply voltage with said first and second reference voltages;
   discharge means coupled to said comparison means and to said integration capacitor for discharging the electrical charge stored in said integration capacitor when said power supply voltage corresponds to a voltage in a range between said first and second reference voltages.

3. A starting circuit for a motor apparatus which is provided with a motor, comprising:
   first circuit means coupled to said motor for providing a specific signal corresponding to the rotation of said motor;
   an integration capacitor coupled to said first circuit means for storing electrical charge corresponding to said specific signal;
   second circuit means coupled to said integration capacitor and to said motor for transferring a voltage developed in said integration capacitor which corresponds to said specific signal to said motor;
   power supply means for supplying a power supply voltage to said first circuit means;
   first comparison means having a first reference voltage and coupled to said power supply means for comparing said power supply voltage with said first reference voltage to provide a first comparison result;
   said comparison means responsive to said first result, and having a second reference voltage, and coupled to said power supply means and to said first comparison means, for comparing said power supply voltage with said second reference voltage to provide a second comparison result; and
   discharge means responsive to said second comparison result and coupled to said second comparison means and to said integration capacitor, for discharging the electrical charge stored in said integration capacitor when said power supply voltage corresponds to a voltage in a range between said first and second reference voltages.

4. A starting circuit for a motor apparatus which is provided with a motor, comprising:
   first circuit means coupled to said motor for providing a specific signal corresponding to the rotation of said motor;
   an integration capacitor coupled to said first circuit means for storing electrical charge corresponding to said specific signal;
   second circuit means coupled to said integration capacitor and to said motor for transferring a voltage developed in said integration capacitor which corresponds to said specific signal to said motor;
   power supply means for supplying a power supply voltage to said first circuit means;
   first comparison means having a first reference voltage and coupled to said power supply means for comparing said power supply voltage with said first reference voltage to provide a first comparison result;

second comparison means having a second reference voltage and coupled to said power supply means, for comparing said power supply voltage with said second reference voltage to provide a second comparison result; and discharge means coupled to said first and second comparison means and to said integration capacitor and responsive to said first and second comparison results, for discharging the electrical charge stored in said integration capacitor when said power supply voltage corresponds to a voltage in a range between said first and second reference voltages.

5. A starting circuit of claim 3 or 4, wherein said power supply means includes first and second power circuits, said power supply voltage being provided between said first and second power circuits; and wherein said first comparison means includes:
a first transistor of a first conductivity type and having a base coupled to said first power circuit, an emitter coupled to said second power circuit and a collector from which said first comparison result is provided;

a second transistor of said first conductivity type and having a base and an emitter respectively coupled to said base and emitter of said first transistor; and a third transistor of a second conductivity type and having a base and collector respectively coupled to said collector and base of said second transistor.

6. A starting circuit of claim 3 or 4, wherein said power supply means includes first and second power circuits; said power supply voltage being provided between said first and second power circuits; and wherein said first comparison means includes:
a first transistor of a first conductivity type and having a base coupled to said first power circuit, an emitter coupled to said second power circuit and a collector from which said first comparison result is provided; and a level shift device coupled between said first power circuit and said base of said first transistor for determining said first reference voltage in cooperation with the base-emitter threshold voltage of said first transistor.

7. A starting circuit of claim 5, wherein said second comparison means includes:
a comparison transistor of a first conductivity type having a base coupled to the collector of said first transistor, an emitter coupled to said second power circuit and a collector from which said second comparison result is provided; and a conduction device coupled between said first power circuit and the base of said comparison transistor for transferring said power supply voltage to said comparison transistor.

8. A starting circuit of claim 6, wherein said second comparison means includes:
a comparison transistor of a first conductivity type having a base coupled to the collector of said first transistor, an emitter coupled to said second power circuit and a collector from which said second comparison result is provided; and a conduction device coupled between said first power circuit and the base of said comparison transistor for transferring said power supply voltage to said comparison transistor.

9. A starting circuit of claim 5, wherein:
said first comparison means includes a common emitter device coupled between the emitter of said first transistor and said second power circuit; and said second comparison means includes:
a voltage divider coupled between said first and second power circuits for providing a divided voltage corresponding to said power supply voltage; and a comparison transistor of a first conductivity type and having an emitter coupled to the emitter of said first transistor, a base to which said divided voltage is supplied and a collector from which said second comparison result is provided.

10. A starting circuit of claim 6, wherein:
said first comparison means includes a common emitter device coupled between the emitter of said first transistor and said second power circuit; and said second comparison means includes:
a voltage divider coupled between said first and second power circuits for providing a divided voltage corresponding to said power supply voltage; and a comparison transistor of a first conductivity type and having an emitter coupled to the emitter of said first transistor, a base to which said divided voltage is supplied and a collector from which said second comparison result is provided.

11. A starting circuit of claim 7, wherein said discharging means includes a switch transistor of a second conductivity type having an emitter-collector path coupled in parallel with said integration capacitor and a base coupled to the collector of said comparison transistor.

12. A starting circuit of claim 8, wherein said discharging means includes a switch transistor of a second conductivity type having an emitter-collector path coupled in parallel with said integration capacitor and a base coupled to the collector of said comparison transistor.

13. A starting circuit of claim 9, wherein said discharging means includes a switch transistor of a second conductivity type having an emitter-collector path coupled in parallel with said integration capacitor and a base coupled to the collector of said comparison transistor.

14. A starting circuit of claim 10, wherein said discharging means includes a switch transistor of a second conductivity type having an emitter-collector path coupled in parallel with said integration capacitor and a base coupled to the collector of said comparison transistor.

* * * * *